United States Patent [19]

Leithäuser et al.

[11] 4,281,036

[45] Jul. 28, 1981

[54] METHOD FOR COATING FINE PARTICULATE EXPANDABLE STYRENE POLYMERS

[75] Inventors: Horst Leithäuser; Heinz Osterhoff; Karl Trukenbrod, all of Marl, Fed. Rep. of Germany

[73] Assignee: Chemische Werke Hüls AG, Marl, Fed. Rep. of Germany

[21] Appl. No.: 171,829

[22] Filed: Jul. 24, 1980

[30] Foreign Application Priority Data

Aug. 9, 1979 [DE] Fed. Rep. of Germany ....... 2932321

[51] Int. Cl.³ .............................................. B32B 27/02
[52] U.S. Cl. ...................................... 427/222; 521/57
[58] Field of Search .......................... 427/222; 521/57

[56] References Cited

FOREIGN PATENT DOCUMENTS 817981 8/1959 United Kingdom ................ 260/2.51 B Primary Examiner—Sam Silverberg
Attorney, Agent, or Firm—Gilbert L. Wells

[57] ABSTRACT

Fine particulate expandable styrene polymers have coatings applied thereto by:

(a) introducing the fine particulate expandable styrene polymers into a closed mixing vessel;
(b) reducing the pressure in the mixing vessel below atmospheric;
(c) preparing dispersions of the coating materials and heating the dispersions to about 30° to 90° C.; and
(d) aspirating the heated dispersions of the coating materials into the mixing vessel while simultaneously mixing the dispersions with the particulate styrene polymers to form a coating thereon and drying the coated particles.

13 Claims, No Drawings

METHOD FOR COATING FINE PARTICULATE EXPANDABLE STYRENE POLYMERS

CROSS-REFERENCE TO RELATED APPLICATIONS

Applicants claim priority under 35 USC 119 for application P 29 32 321.5, filed Aug. 9, 1979 in the Patent Office of the Federal Republic of Germany.

BACKGROUND OF THE INVENTION

The field of the invention is fine particulate, expandable styrene polymers for the preparation of molded articles. The present invention is particularly concerned with coating the particulate, expandable styrene polymers with dispersions of known coating materials and using the coated expandable styrene polymers in the manufacture of molded foam articles.

The state of the art of expandable polystyrene may be ascertained by reference to Kirk-Othmer, "Encyclopedia of Chemical Technology," 2nd Edition, Vol. 9 (1966) under the section entitled "Foamed Plastics," pages 847–884, particularly pages 852, 853 and 855 where polystyrene is disclosed, and Vol. 19 (1969) under the section entitled "Styrene Plastics," pages 85–134, particularly pages 116–120, where polystyrene foams are disclosed and U.S. Pat. Nos. 3,480,570 and 3,972,843; British Pat. Nos. 1,199,591 and 1,409,285; and West German Published Applications Nos. 12 98 274, 14 94 940 and 17 94 007; the disclosures of which are incorporated herein.

U.S. Pat. No. 3,972,843 discloses methods, useful in the present invention, for producing particulate molding compositions for the production of foamed articles by polymerizing styrene in aqueous suspension.

Expandable fine particulate styrene polymers, that is, fine particulate styrene polymers containing a gaseous or liquid expanding agent, are processed into molded articles by being heated to temperatures above the boiling point of the expanding agent and the softening point of the polymer in closed molds which are permeable to gases.

Conventionally the foamable particles are first foamed incompletely and following this process, which is called "prefoaming," they are sintered in closed molds permeable to gases, this latter step being termed final foaming.

The particles should not sinter or adhere into aggregates during prefoaming. The particles furthermore should remain friable when being moved, and should not charge electrostatically. Therefore, to prevent aggregation and formation of static charges, the particles may be provided with coatings.

Known coating materials include fine pored, pulverulent inorganic compounds such as silicon dioxide, talc, clay, magnesium oxide, magnesium hydroxide, magnesium carbonate, further organic compounds such as waxes, metallic soaps, for instance magnesium stearate or zinc stearate, ricinic acid amide, lauric acid diethanol amide, bis-stearoylethylenediamine, esters of fatty acids and polyhydroxy compounds such as glycerin stearates or sorbitol esters as disclosed in U.S. Pat. No. 3,480,570 and British Pat. No. 1,409,285 and further, fine powder thermoplastics such as disclosed in W. German Published Application No. 12 98 274.

It is further known to deposit the coating materials by the dry mix process on the expandable styrene polymers. This procedure suffers from the drawback that the transfer is freqently uneven and adheres poorly. Due to these poorly adhering transfer materials, excessive concentrations may occur at individual places. These concentrations cause aggregations in the prefoaming process or result in depositions on the conveying systems. Non-uniform coatings also produce poor sintering in the final foaming and therefore result in molded bodies of low mechanical strength and produce adverse insulating properties.

It is further known to use emulsifying dispersions of emulsion polymers for the coating. The coating is achieved by precipitating the emulsion polymer in the presence of the foamable styrene polymers as disclosed in W. German Published application No. 17 94 007. This procedure suffers especially from the drawback that part of the emulsion polymer is present in the form of dust in the final product, and that the emulsifiers contained in the dispersion are jointly separated which leads to an increased absorption of water in the prefoaming beads during the prefoaming process and to a poorer friability. Again, the molded bodies made from the prefoam beads fuse more poorly than those prefoamed beads free of emulsifiers.

West German Published Application No. 14 94 940 discloses a process in which chlorinated dispersions are deposited in order to flame-proof foamable styrene polymers and in which the dispersing agent is evaporated, the dispersion also being deposited if desired by spraying. A similar process for depositing coating materials is described in British Pat. No. 1,199,591, wherein solutions, dispersions and also spraying are disclosed.

Such prior art proposals result in inevitable drawbacks due to dust formation and the difficulties in achieving uniform, solidly adhering coatings of specific thickness by spraying dispersions of solutions.

As a rule, these prior art methods produce depositions of the "spray fog" not only on the beads, but also on the wall surfaces of the container, and further the nozzles easily clog, whereby a non-uniform distribution of the coating materials results which requires substantial monitoring.

Conventionally, the coating materials are added to the graded and sifted foamable styrene polymers because the improper grain ordinarily accumulating from the polymerization is used again and degrades the suspension stability in coated form.

SUMMARY OF THE INVENTION

Having in mind the limitations of the prior art, it is an object of the present invention to produce a firmly adhering, uniform coating on particulate expandable styrene polymers. Other objects of the present invention are the retention of good friability and adhesion during prefoaming of the particles. Another object of the present invention is the use of so-called water moist crude beads prior to grading. Still another object of the present invention is the feed back of accumulated improper grain into the suspension polymerization without the incursion of adverse effects.

These objects are achieved according to the present invention by:

(a) introducing the fine particulate expandable styrene polymers into a closed mixing vessel;

(b) reducing the pressure in the mixing vessel below atmospheric;

(c) preparing dispersions of the coating materials and heating the dispersions to about 30° to 90° C.; and (d) aspirating the heated dispersions of the coating materials into the mixing vessel while simultaneously mixing the dispersions with the particulate styrene polymers to form a coating thereon and drying the coated particles.

Advantageously, the dispersions are preheated to 60° to 90° C., before being introduced.

It is known that such properties as cooling time and the cellular nature of the expandable styrene polymers are negatively affected when coating and drying is carried out at temperatures above 35° to 40° C. On the other hand, the friability of the styrene polymers is degraded when coating materials are used, where the softening point is below 45° C. Thus, even when rapidly operating mixers are used with the higher temperatures occurring thereby, it is not feasible to deposit the required amounts of coating materials in adequate rates with good distribution so as to adhere firmly to the styrene polymers.

Accordingly, it could not be expected from the prior art that the essentially hotter dispersions would be free from degrading effects when they are used in coating.

DESCRIPTION OF THE PREFERRED EMBODIMENTS

The dispersions are also used as so-called pastes and as a rule have a solid content of about 5 to 35, preferably from 10 to 25% by weight. Preferably aqueous dispersions are used, though aqueous-alcoholic dispersing agents, preferably in the weight ratio of 50/50 to 90/10 are also useful or also aliphatic hydrocarbons. The aliphatic hydrocarbons, however, are less preferred. Methanol is especially suited as the alcohol. The viscosity of the dispersions is adequately low and is adjustable to the desired value within the specified temperature ranges.

Especially advantageous dispersions contain mixtures of monostearates and distearates of glycerin or the sorbitol ester of palmitic acid as the dispersing agents. Mixtures with dispersing agents of metallic soaps such as magnesium zinc stearate or calcium stearate or bisstearylethylenediamine are also used advantageously.

The concentration of the coating materials to be deposited as a rule amounts to about 0.05 to 0.6, preferably 0.1 to 0.5% by weight, referred to the expandable styrene polymer. For the coarser particles (about 0.9 to 3.0 mm in diameter), concentrations of about 0.1 to 0.2% by weight are sufficient and as regards the smaller particles (about 0.3 to 0.9 mm in diameter), on the other hand, about 0.2 to 0.6% by weight are advantageously used.

Small-particulate expandable styrene polymers are preferably the styrene polymers obtained by suspension polymerizations, which in addition to styrene may also contain small amounts of such copolymerizing compounds as acrylic or methacrylic acid esters, acrylonitrile, butadiene, or such elastomeric compounds as polybutadiene, butadiene-styrene copolymers, ethylene propylene copolymers or terpolymers. The known low boiling point expanding agents may be added before, during or after the polymerization and include, but are not limited to, aliphatic hydrocarbons and/or halogen hydrocarbons such as pentane, dichlorofluoromethane, butane, that is, organic liquids that do not appreciably dissolve the polymer and which have a boiling point considerably below 100° C.

Obviously, the expandable styrene polymers also may contain flame-proofing agents, antistatic agents, fillers, nucleating agents or dyestuffs, as disclosed in U.S. Pat. Nos. 3,058,926; 3,384,097; 3,789,028 and 3,897,373. The process of the present invention for coating is especially advantageous when so-called water-moist crude beads are used. These beads which are not divided into commercial grain fractions prior to use are obtained in water-moist form from the suspension polymerization after separation from the aqueous phase by washing and centrifuging. The water that adheres in this case is less than 3% by weight, preferably it will be between about 1.0 and 1.5% by weight.

As already stated, the larger particles as a rule require less of the coating means than particles of a smaller diameter because the surface area of large particles is less. Where appropriate, "coarser" or "finer" batches are prepared during the polymerization step. Also, it is possible to divide the crude beads into two fractions with diameters less than 1 mm and larger than 1 mm and to process these fractions separately.

Obviously, it is also possible to combine the process of the present invention with the conventional lubrication of the particles in the mixer where a bead fraction with a higher concentration in coating materials necessarily results in special processing conditions, and where the drawbacks relating to the lubrication of the mixture can be tolerated.

After coating, the beads which are present in dry form are graded and sifted. The improper grain (insufficient or excessive sizes) accumulating thereby are fed back into the suspension polymerization without adverse effects.

Vacuum driers are advantageously suitable for producing the coating, with an operational temperature of about 20° to 35° C., preferably 25° to 30° C., and which allow a uniform turnover of the product. They are provided with one or more bottom inlets for the dispersion and with exhaust means for the vapors. To carry out the process, the drier is loaded with expandable styrene polymer, and a reduced pressure of about 1 to 100 mbars, preferably 5 to 15 mbars, is set. Such a vacuum drier-mixer is disclosed, e.i. by Nautamix B. V., Haarlem, Netherlands, having the designation DBXV 200 RVW—M 19 910.

The required amount of coating material then is aspirated from below through one or more conduit stubs and distributed over the beads. The beads are mixed and dried at reduced pressure.

The dried small particulate styrene polymers are obtained with a uniform surface coating and when required can be graded.

The following specific examples and control examples demonstrate the advantageous results obtained with respect to the process of the present invention over the state of the art.

The following dispersions were used:

(A) 325 parts by weight of fully desalted water (or potable water) were heated to 90° C. While stirring vigorously, 175 parts by weight of a mixture of glycerin monostearate and distearate are introduced into the heated water. After stirring for 30 to 60 minutes, a fine-particulate dispersion with a solid content of about 35% by weight is obtained. The dispersion is used at a temperature of 80° C.

(B) A dispersion with 20% by weight of solid content glycerin stearates is prepared under the same conditions, and used at a temperature of 75° C.

(C) 100 Parts by weight of a commercial sorbitol palmitic acid ester are slowly introduced into a 60° C. mixture of 110 parts by weight of fully desalted water and 110 parts by weight of methanol. Without heating but while stirring vigorously, 180 parts by weight of 15° C. water are used to slowly dilute. The solid content of the dispersion is 20% by weight. The dispersion is used at a temperature of 30° C.

(D) In a similar manner, a dispersion with a solid content of 35% by weight is prepared and used at a temperature of 45° C.

(E) 400 Parts by weight of fully desalted water are heated to 90° C. 75 Parts by weight of a commercial mixture of glycerin monostearate and distearate and 25 parts by weight of magnesium stearate are introduced while stirring vigorously. The mixture is allowed to cool to 70° C. while being stirred vigorously. The dispersion is present in the form of a paste with a solid content of 20% by weight and is used at a temperature of 70° C.

CONTROL EXAMPLES 1a–g

Dry, foamable polystyrene beads with grain diameters of
(α) 0.9 to 2.0 mm
(β) 0.5 to 0.9 mm
are mixed at different times in a Nautamix type mixer having the designation MBXE—28 R and manufactured by Nautamix B. V., Haarlem, Netherlands, at room temperature with 0.1 parts by weight of a commercial mixture of glycerin monostearate and distearate. Upon completion of the mixing time, the proportion of "free" coating materials is determined by sifting.

The same control examples are repeated at temperatures of 20° to 35° C. As shown in Table I, less than 50% of the added coating materials adhere tightly to the bead surface.

materials being sprayed in the form of a melt onto the beads during the mixing process within 4 to 9 minutes.

Result: about 82% of the coating materials are distributed unevenly on the head surface, about 13% are contained in the product in the form of dust and the losses amount to about 5% (wall deposits and dust losses).

Batch operation is substantially impossible due to frequent nozzle clogging.

Control Example 3 (according to W. German Published Application No. 14 94 940)

Control Example 2 is repeated, except for the variation that a 10% aqueous dispersion is added during the mixing process to the beads present in the mixer. After a 15 minute mixing time, the water is evaporated by means of hot air. The deposition is satisfactorily uniform, as 92% of the bead surface tightly bonds the coating materials and as there is only 5% dust in the product with only slight deposits in the mixer. However, the water evaporation substantially encumbers the discontinuous mixing process, as on one hand the mixing times ought to be short, and on the other the air flows may not be large in order to prevent dusting. Analytic monitoring of the drying process constitutes an additional complexity.

Examples 1A–E

The dispersions A–E are used. These dispersions are aspirated in a vacuum drier filled about 75% with 20 tons of undried, expandable polystyrene beads 0.4 to 3.0 mm in grain diameter. The pressure is 10 to 25 mbars. Mixing proceeds for about 4 to 5 hours at the stated pressure and drying is at 30° C.

The results from the Control Examples 1–3 and specific Examples 1A–E are tabulated in Table II.

Not only do the coating means obtained in the examples adhere better substantially, they are also spread uniformly.

TABLE II

| Example | Dispersion | % coating materials total | on bead surface | free | Deposition | Friability | Remarks |
|---|---|---|---|---|---|---|---|
| 1A | A (80° C.) | 0.1 | 0.1 | 0 | uniform | satisfactory | — |
| 1B | B (75° C.) | 0.2 | 0.2 | 0.1 | uniform | satisfactory | Beads contain flame-proffing agent |
| 1C | C (30° C.) | 0.1 | 0.1 | 0 | uniform | satisfactory | — |
| 1D | D (45° C.) | 0.2 | 0.2 | Trace | uniform | satisfactory | — |
| 1E | E (70° C.) | 0.1 | 0.1 | Trace | uniform | good | — |

TABLE I

| Test # | Bead type | Mixing time (min) | Mixing or production temp. in °C. | "Free" coating materials in % (referred to amount of input) | Remarks |
|---|---|---|---|---|---|
| 1a | α | 10 | 20 | 79 | very uneven |
| 1b | β | 20 | 22 | 72 | moderate coating |
| 1c | β | 30 | 23 | 67 | |
| 1d | α | 45 | 25 | 62 | high dust proportion |
| 1e | α | 20 | 32 | 69 | |
| 1f | α | 30 | 32 | 62 | |
| 1g | α | 40 | 35 | 54 | |

Control Example (according to British Pat. No. 1,199,591)

Foamable polystyrene beads (0.5 to 0.9 mm in diameter) are provided with 0.3% of the same coating materials in the same mixer as in Example 1, these coating

EXAMPLE 2

This examples illustrates (Table III) that the defective grain obtained in the coating process of the invention can be used again in the suspension polymerization without thereby incurring adverse effects.

TABLE III

| Improper Grain of Example | Amount of improper grain used (0.5; 2.5 mm) % | % of coating materials added to the batch | suspension stability and grain size distribution |
|---|---|---|---|
| 1A | 10 | 0.01 | normal |
| 1C | 5 | 0.005 | normal |
| 1E | 10 | 0.001 | normal |
| Control Example 1b (improper grain | 0.5 | about 0.4 | Unstable suspension and pronounced coarsening |

TABLE III-continued

| Improper Grain of Example | Amount of improper grain used (0.5; 2.5 mm) % | % of coating materials added to the batch | suspension stability and grain size distribution of grain |
|---|---|---|---|
| 0.5 mm) | | | |

We claim:

1. In a method for coating fine particulate expandable styrene polymers with dispersion of coating materials, the improvement comprising:
   (a) introducing the fine particulate expandable styrene polymers into a closed mixing vessel;
   (b) reducing the pressure in the mixing vessel below atmospheric;
   (c) preparing dispersions of the coating materials and heating the dispersions to about 30° C.; and
   (d) aspirating the heated dispersions of the coating materials into the mixing vessel while simultaneously mixing the dispersions with the particulate styrene polymers to form a coating thereon and drying the coated particles.

2. The method of claim 1, wherein ungraded, watermoist, fine-particulate expandable styrene polymers are used and the coated particles are then graded by size.

3. The method of claim 2, wherein rejected grain sizes are recirculated into the suspension polymerization for the purpose of preparing additional expandable styrene polymers.

4. The use of the coated particles of claim 1 in the manufacture of molded articles.

5. The method of claim 1, wherein the pressure of step (b) is about 1 to 100 millibars.

6. The method of claim 1, wherein the pressure of step (b) is about 5 to 15 millibars.

7. The method of claim 5, wherein said dispersions of step (c) have a solid content of about 5 to 35% by weight.

8. The method of claim 7, wherein said coating amounts to about 0.05 to 6% by weight of said particulate styrene polymers.

9. The method of claim 1, wherein said particulate styrene polymers have a particle size between about 0.3 to 3.0 mm in diameter.

10. The method of claim 1, wherein said particle size is between about 0.3 to 0.9 mm in diameter.

11. The method of claim 9, wherein said particle size is between about 0.9 to 3.0 mm in diameter.

12. The method of claim 1, wherein said coating materials are selected from the group consisting of glycerin stearates, metallic soaps and bis-stearylethylenediamine.

13. The method of claim 2, wherein watermoist, expandable styrene polymers have a water content of about 1.0 to 1.5% by weight based on said styrene polymers.

* * * * *